United States Patent
Kruse et al.

(10) Patent No.: US 7,177,758 B2
(45) Date of Patent: Feb. 13, 2007

(54) METHOD FOR OPTIMIZING CHARACTERISTICS MAP

(75) Inventors: Thomas Kruse, Stuttgart (DE); Volker Imhof, Kornwestheim (DE); Ernst Kloppenburg, Stuttgart (DE); Harald Stuhler, Saint-Ouen Cedex (FR)

(73) Assignee: Robert Bosch GmbH, Stuttgart (DE)

( * ) Notice: Subject to any disclaimer, the term of this patent is extended or adjusted under 35 U.S.C. 154(b) by 74 days.

(21) Appl. No.: 11/133,749

(22) Filed: May 19, 2005

(65) Prior Publication Data
US 2005/0273242 A1     Dec. 8, 2005

(30) Foreign Application Priority Data
May 28, 2004     (DE)     ............ 10 2004 026 583

(51) Int. Cl.
*G06F 19/00*     (2006.01)
*G01L 3/26*     (2006.01)
(52) U.S. Cl. ................................ 701/114; 73/116
(58) Field of Classification Search .......... 701/101, 701/103, 114, 115, 116; 73/116, 117.2, 117.3
See application file for complete search history.

(56) References Cited

U.S. PATENT DOCUMENTS

| | | | | |
|---|---|---|---|---|
| 4,337,839 A | * | 7/1982 | Taplin | ............ 180/179 |
| 4,346,776 A | * | 8/1982 | Taplin | ............ 180/179 |
| 6,246,951 B1 | * | 6/2001 | Robichaux et al. | ......... 701/110 |
| 6,807,939 B1 | * | 10/2004 | Doelker et al. | ............ 123/350 |
| 6,904,793 B2 | * | 6/2005 | Kanke et al. | ............ 73/118.2 |
| 2003/0070494 A1 | * | 4/2003 | Kanke et al. | ............ 73/861.19 |

FOREIGN PATENT DOCUMENTS

| | | |
|---|---|---|
| DE | 100 20 448 | 10/2001 |
| DE | 102 19 797 | 11/2003 |

* cited by examiner

*Primary Examiner*—John T. Kwon
(74) *Attorney, Agent, or Firm*—Kenyon & Kenyon LLP

(57) ABSTRACT

A method for optimizing characteristics maps for the control of an internal combustion engine in which a model of the internal combustion engine is first formed by measurements on the internal combustion engine. In the process, a dependency of output variables of the internal combustion engine on the characteristics maps is illustrated. In the optimization, the dependency of the output variables of the internal combustion engine on the characteristics maps and the smoothing of the characteristics maps are optimized simultaneously.

8 Claims, 2 Drawing Sheets

METHOD FOR OPTIMIZING CHARACTERISTICS MAP

FIELD OF THE INVENTION

The present invention relates to a method for optimizing characteristics maps for the control of an internal combustion engine.

BACKGROUND INFORMATION

German Patent Application No. DE 100 20 448 describes a method for optimizing characteristics maps in which a model of the combustion engine is formed by measurements on an internal combustion engine. This model is then utilized for an actual optimization of characteristics maps used to control the combustion engine.

German Patent Application No. DE 102 19 797 describes a method for optimizing characteristics maps in which smoothing of the characteristics maps is taken into account.

SUMMARY OF THE INVENTION

The method according to the present invention for optimizing characteristics maps has the advantage over the related art of providing a cost-effective method for generating smooth characteristics maps for the control of an internal combustion engine.

In a particularly simple manner, the control is implemented via the characteristics maps in that the characteristics maps ascertain control variables for the internal combustion engine as a function of operating states of the combustion engine. In an especially uncomplicated manner, a polynomial, preferably of the second order, is utilized to form the model. Such a model produces a particularly good image of the internal combustion engine if a separate polynomial is assigned to each operating state. Furthermore, secondary conditions with respect to the output variables of the internal combustion engine and the control variables of the internal combustion engine are taken into account in the optimization. This may be accomplished by not allowing specific ranges of output variables or control variables or by appropriately considering specific ranges of output variables or control variables in the models.

DETAILED DESCRIPTION

Figure 1:
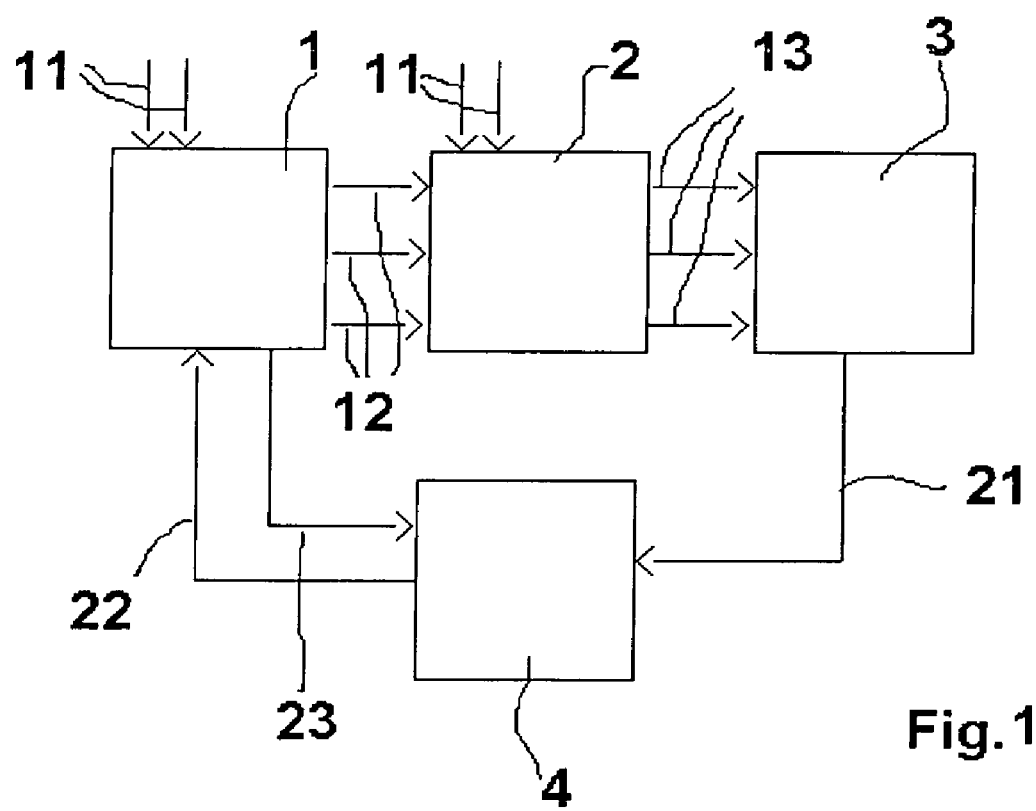
FIG. 1 shows a test stand with an internal combustion engine, in schematic form.

FIG. 1 shows, in schematic form, a device for optimizing characteristics maps for the control of an internal combustion engine. An internal combustion engine 2 is triggered by control variables 12, and corresponding output variables 13 of internal combustion engine 2 are generated. Control variables 12 are produced by a control device 1 which in turn is supplied with operating states 11. The analysis of output variables 13 of the internal combustion engine is carried out by an evaluation unit 3. Operating states 11 are operating states of internal combustion engine 2, for instance the rotational speed and the load. Additional operating states of internal combustion engine 2 could be external environmental conditions such as the air temperature, air pressure and the like. Hereinafter, the terms load and rotational speed are used as synonyms for the operating states. Depending on these operating states 11, control device 1 ascertains control variables 12. These control variables 12 may be a multitude of variables for influencing the operation of internal combustion engine 2. Typical control variables are, for example, the ignition angle, the injection start, the exhaust-gas recirculation rate, the pressure in the intake manifold or the position of the throttle valve, the charge pressure of a turbocharger and other control variables. Especially in modern gasoline engines in which the fuel is injected directly, a multitude of control variables is conceivable for influencing internal combustion engine 2.

The combustion in internal combustion engine 2 is influenced as a function of the control variables or the operating states, which may be established by corresponding measurable output variables 13. Such output variables 13 are, for instance, the torque or output delivered by the internal combustion engine, the running smoothness or running irregularity and other output variables. It is the goal of the optimization to determine, for each operating state 11, those control variables 12 that provide optimal output variables 13. Since the demands on various output variables 13 compete with one another in some instances, the corresponding output variables must be weighted relative to one another, i.e., the interrelationship of the control variables must be ascertained in the optimization, and it must be determined to what extent one control variable is improved at the expense of the other control variable. Legal limits, in particular with respect to exhaust-gas emissions, must be observed in the process and taken into account in the optimization as ancillary conditions. Moreover, not all control variables 12 are able to be modified as desired since the corresponding actuating elements or actuators are subject to limitations in their actuating range. These limitations of the actuating variables must therefore also be considered as ancillary conditions in the optimization. An optimizer 4, which is connected to signal processor 3 via a data line 21, is provided for the optimization. Output variables 13, which have been measured by signal processor 3 and, if appropriate, have been processed as well, are forwarded to optimizer 4 via this data line 21. Furthermore, optimizer 4 is also connected to control device 1 by way of data lines 22 and 23. Via this data line, optimizer 4 has the opportunity of modifying control device 1, in particular the opportunity of influencing the determination of control variables 12 as a function of operating states 11. In addition, the optimizer is informed of operating states 11 and utilized control variables 12 via line 23.

For the purpose of an optimization, it is now possible to use a real internal combustion engine 2 in the device according to FIG. 1. The triggering of a real internal combustion engine on an engine test stand or in a motor vehicle is implemented in that a corresponding control device calculates corresponding control variables 12 as a function of operating states 11. The calculation of control variables 12 utilizes characteristics maps, i.e., data sets that assign specific output conditions to specific input conditions. Because of these stored data sets, complex correlations between input data and output data are able to be represented in an especially simple manner by corresponding nodes, the corresponding output data being ascertained at points between the nodes by way of interpolation. Due to the use of such characteristics maps, no complex mathematical functions have to be calculated by the control units, which improves the operating safety and also the speed at which control variables 12 are ascertained. In an optimization on a real internal combustion engine 2, a control unit, which differs from the normal control device manufactured in series production only in that the data in the characteristics maps are able to be modified, is generally used as control device 1. This is done by optimizer 4. However, as an alternative, the control device may also be embodied as a program in a computer. Nevertheless, the calculations are implemented on the basis of stored characteristics maps. By modifying the data of the characteristics maps in control device 1, the characteristics maps are able to be optimized by analyzing output variables 13. To this end, optimizer 4 modifies the characteristics maps in control device 1, and it is ascertained whether the corresponding output variables such as the fuel consumption or emissions are changed for the better by this variation. This procedure corresponds to the procedure known from German Patent Application No. DE 102 19 797, for instance. However, because of the multitude of control variables, this process is very time-consuming.

German Patent Application No. DE 100 20 448 therefore suggests the use of a virtual internal combustion engine 2. Such a virtual internal combustion engine 2 is made up of a mathematical model, which indicates the dependency of output variables 13 on control variables 12 and operating states 11. This calculation model is formed by measurements on a real internal combustion engine 2. The advantage is that the production of the model is considerably easier than an optimization of all control variables, since the functional dependency between control variables 12 and output variables 13 is able to be determined by a few measurements within the framework of the predefined model. Once a corresponding virtual combustion engine has then been formed with the aid of these measurements, the actual optimization of the characteristics maps, which, after all, are to be used in control device 1 to control the real internal combustion engine, will be carried out on the basis of this virtual internal combustion engine. In other words, once again a control unit 1 is used, which calculates control variables 12 in the same manner as a finished standard control device, utilizing characteristics maps. With the aid of virtual internal combustion engine 2 it is then checked in which way output variables 13 may be optimized by modifying the characteristics maps in control device 1. Since no real internal combustion engine, but a virtual combustion engine is used, the entire procedure is able to run on a computer, making it considerably faster and more cost-effective since no test stand is required for the internal combustion engine. Basically, the calculation model of virtual internal combustion engine 2 is used here to optimize the computational model of the standard control device with the aid of characteristics maps. However, the computational model of virtual internal combustion engine 2 requires a computer capacity that by far exceeds the capacity of a normal engine control device. Virtual internal combustion engine 2 is therefore only a development means and not suitable to replace the current engine control units operating on the basis of characteristics maps.

When ascertaining the characteristics maps for control device 1, in addition to optimizing output variables 13 by the selection of correct control variables 12 as a function of individual operating state 11, the smoothing of the characteristics maps in control device 1 is taken into account as well. To this end, the smoothing is calculated from a proximity relationship of the nodes of the individual characteristics maps. This process may consider either only the immediate neighbors of each node or else more distantly located neighbors of nodes as well. Furthermore, the individual nodes of the characteristics maps are also interconnected in that the output variables are influenced. As a consequence, an overall analysis is called for, i.e., the smoothing of all characteristics maps and the dependency of all output variables 13 on the characteristics maps must jointly be taken into account in an optimization. This is accomplished by mathematically implementing a joint or simultaneous optimization of all analyzed variables, i.e., smoothing of all characteristics maps and all output variables 13. The individual influence of the various contributions is taken into account via appropriate weighting factors. In this way the influence of certain variables is able to be accorded a different weight.

For instance, the smoothing of the characteristics map for the ignition angle may be weighted more heavily than that for another characteristics map. In the same way, the different output variables 13 may be weighted with respect to one another or relative to the smoothings of the characteristics maps. For example, it is quite possible to assign greater weight to the exhaust-gas discharge than to fuel consumption. If the characteristics maps are smoothed, control variables 12 will be prevented from jumping back and forth in response to slight variations in operating states 11. Since the values between the nodes of the characteristics maps are interpolated, it would otherwise come to senseless sudden changes and variations of control variables 12 when traversing the characteristics map during dynamic operation or during fluctuations of the operating states about a particular operating state. This would have a detrimental effect on the operation of the real internal combustion engine by control device 1. For this reason, the present invention provides that in a joint optimization, in addition to optimizing output variables 13, the smoothing of the utilized characteristics maps be considered as well.

Figure 2:
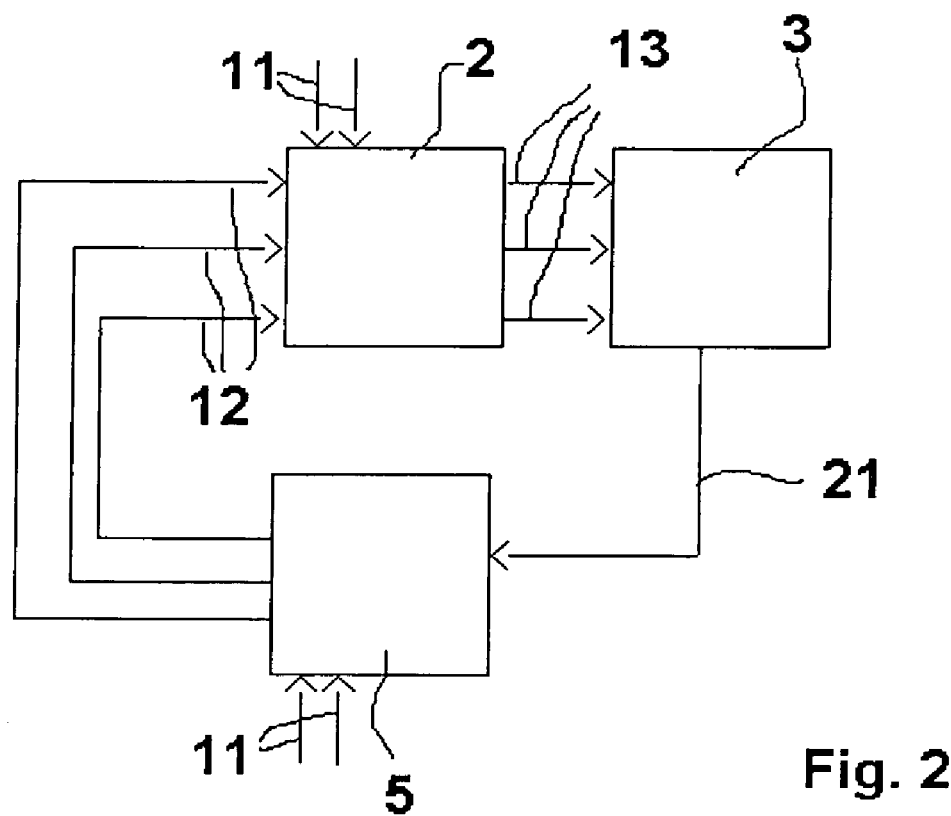
FIG. 2 shows ascertaining of a model of the internal combustion engine.

FIG. 2 illustrates how the parameters for the virtual internal combustion engine, as it is used in FIG. 1 to optimize control device 1, are obtained by measurements on a real internal combustion engine 2. Reference numerals 2, 3, 11, 12, 13 and 21 again denote the same subject matters as in FIG. 1, although internal combustion engine 2 in this case denotes a real internal combustion engine and not a virtual combustion engine. Control signals 12 for controlling internal combustion engine 2 are generated as a function of operating states 11, and the corresponding response of the internal combustion engine is detected by signal processor 3 on the basis of output variables 13 and acknowledged to a computer 5 via data line 21. Computer 5 stores a model of the internal combustion engine, which correspondingly assigns output variables 13 to the possible combinations of control variables 12 and operating states 11. It is known, for instance, that the torque supplied by engine 2 increases when the ignition angle is advanced. However, if the ignition angle is advanced too much, the combustion is accompanied by knocking which leads to destruction of the engine. Although the fundamental dependency between ignition angle and torque is known, the specific dependency, i.e., how far the ignition angle in a useful manner is able to be advanced for the real engine, is not known, but must be ascertained by actual measurements on the particular internal combustion engine. It is thus necessary to determine the specific parameters of the models. Once these parameters are known, the function of real internal combustion engine 2 is verifiable in a simple and rapid manner by corresponding calculations on the basis of the mathematical model stored in computer 5. That is to say, if the model of virtual internal combustion engine 2 has been ascertained with respect to the parameters by measurements on a real internal combustion engine 2, this model may then be used for the optimization as described in connection with FIG. 1.

A particularly simple mathematical model may be obtained by forming an individual local model for a series of operating states in which output variables 13 depend on control variables 12 as polynomial. To determine the model, certain operating states 11 on which the local models are formed are selected first. One example for an operating state 11 is no-load running, i.e., rotational speed=no-load rotational speed, and no load is requested by the driver. For each analyzed operating state, the coefficients of a polynomial, which indicates the correlation between control variables 12 and output variables 13, are then determined. In this local model the correlation between control variables S1, S2, S3, etc. and output variables A1, A2, etc. is represented in the form of a polynomial, for instance a second-order polynomial, in the form that $$A1 = K1.0 + K1.1*S1 + K1.2*S1^2 + K1.3*S2 + K1.4*S2^2 + K1.5*S1*S2 + K1.6*S3 + \ldots$$

$$A2 = K2.0 + K2.1*S1 + K2.2*S1^2 + K2.3*S2 + K2.4*S2^2 + K2.5*S1*S2 + K2.6*S3 + \ldots$$

In addition to polynomials (also higher-order polynomials) any other mathematical functions indicating the correlation between control variables and output variables are able to be used as well. To determine the output variable A1 for this particular operating state (load point and rotational speed point), the values for coefficients K1.O, K1.1, etc. may be determined by selective variation of control variables S1, S2, etc., measurement of A1 and a subsequent regression calculation. In this manner, it is relatively easy to determine what kind of dependency exists between control variables S and output variables A for this operating state. By measuring a multitude of load and rotational speed combinations, a multitude of local models is ascertained in this manner, which, in their totality, form a model of the internal combustion engine that indicates the relationships between control variables S and output variables A across a wide range of loads and rotational speeds. No precise knowledge of the physical dependencies between the output variables and the control variables is required in this context.

When selecting the load and rotational speed points at which the measurements are to be made, specific operating states, which are of special importance for the subsequent operation of the internal combustion engine, should be taken into account, in particular. The time required for measuring the coefficients is relatively insignificant compared to the measurements that would be required on a real internal combustion engine for the purpose of optimizing the characteristics maps in control device 1. After the coefficients have been determined for the model, control device 1 is then optimized as shown in FIG. 1, i.e., the model is used to optimize the characteristics maps in control device 1.

Figure 3:
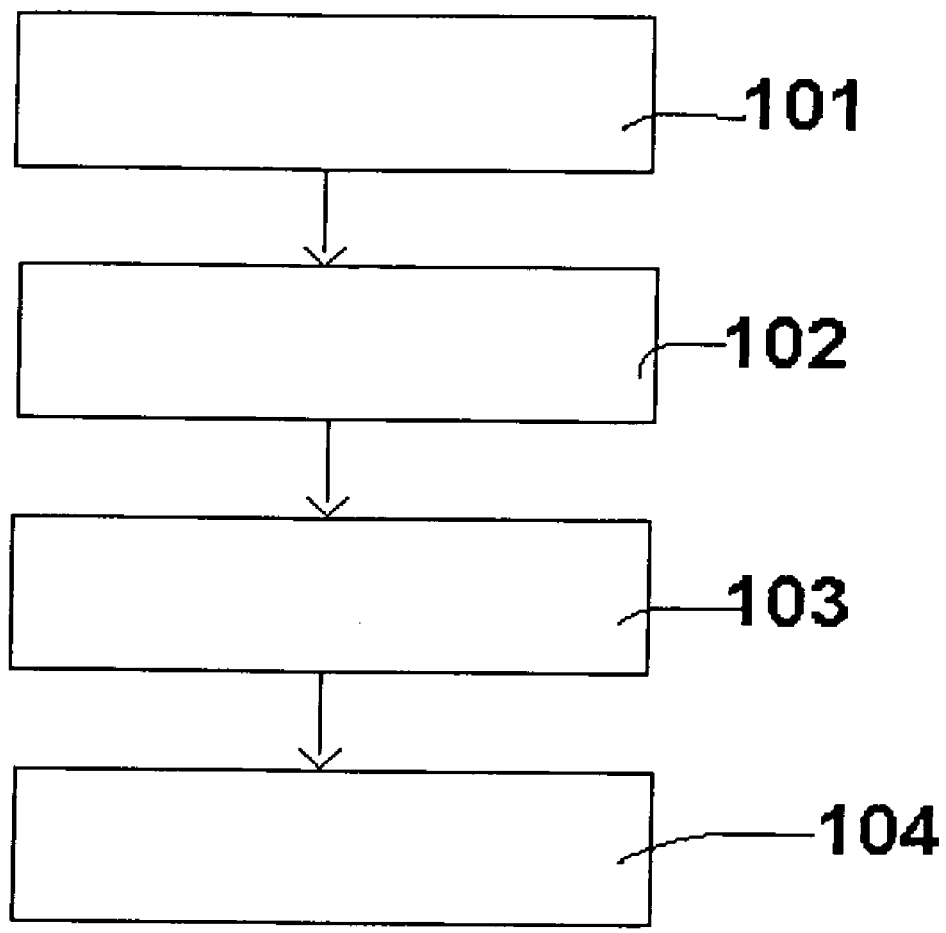
FIG. 3 shows method steps of the method according to the present invention.

FIG. 3 describes a method sequence for optimizing the characteristics maps in a control device 1. In a first step 101, the operating states are selected that are to be utilized for the model formations. The selected operating states should cover the entire possible range of operating states 11 of the internal combustion engine, and the number of analyzed operating states 11 should be increased in those ranges in which internal combustion engine 2 is operated particularly often. After operating states 11 to be analyzed have been specified, the model parameters are determined in step 102 in a device as described in FIG. 2. In this measurement on a real internal combustion engine, the parameters of the model are ascertained in the previously specified operating states 11. In step 103, the characteristics maps in control device 1 are optimized as illustrated in FIG. 1. Internal combustion engine 2 is formed by virtual internal combustion engine 2. This entire process may also be carried out on a computer in which the internal function of control device 1, i.e., the calculation of control variables 12 as a function of operating states 11, is mapped by corresponding calculation rules. In principle, the optimization of control device 1 is then completely implemented on a computer in which a first computation model (virtual engine) is utilized to optimize a second computational model (control device 1).

After this optimization, the values for the characteristics maps found in this manner are then transferred into a real control device 1 in step 104, and may then be used for operating real internal combustion engine 2.

What is claimed is:

1. A method for optimizing characteristics maps for a control of an internal combustion engine, comprising:
   forming a model of the internal combustion engine by measurements on the internal combustion engine;
   representing a dependency of output variables of the internal combustion engine on the characteristics maps by the model; and
   optimizing simultaneously (a) the dependency of the output variables of the internal combustion engine on the characteristics maps and (b) a smoothing of the characteristics maps.

2. The method according to claim 1, further comprising ascertaining control variables of the internal combustion engine as a function of operating states of the internal combustion engine, using the characteristics maps.

3. The method according to claim 2, wherein the model is made up of a plurality of local models for individually selected operating states.

4. The method according to claim 3, wherein the local models are polynomials, which indicate the dependency of the output variables of the internal combustion engine on the control variables.

5. The method according to claim 4, wherein the polynomials are second-order polynomials.

6. The method according to claim 1, wherein ancillary conditions with respect to the output variables of the internal combustion engine and the control variables of the internal combustion engine are taken into account in the optimization.

7. The method according to claim 6, wherein the ancillary conditions are taken into account by not allowing certain ranges of at least one of (a) output variables and (b) control variables.

8. The method according to claim 6, wherein the ancillary conditions are taken into account by influencing certain ranges of at least one of (a) output variables and (b) control variables in the model.

* * * * *